United States Patent
Baur

(10) Patent No.: US 7,604,740 B2
(45) Date of Patent: Oct. 20, 2009

(54) WASTE ACTIVATED SLUDGE STRIPPING TO REMOVE INTERNAL PHOSPHORUS

(75) Inventor: Robert James Baur, Lake Oswego, OR (US)

(73) Assignee: Clean Water Services, Hillsboro, OR (US)

( * ) Notice: Subject to any disclaimer, the term of this patent is extended or adjusted under 35 U.S.C. 154(b) by 100 days.

(21) Appl. No.: 12/012,362

(22) Filed: Feb. 1, 2008

(65) Prior Publication Data

US 2009/0194476 A1   Aug. 6, 2009

(51) Int. Cl.
   C02F 11/04   (2006.01)
   C02F 3/28    (2006.01)

(52) U.S. Cl. .................. 210/601; 210/609; 210/630; 210/906

(58) Field of Classification Search .............. 210/601, 210/603, 608, 609, 630, 906
   See application file for complete search history.

(56) References Cited

U.S. PATENT DOCUMENTS

| | | | |
|---|---|---|---|
| 5,360,546 A * | 11/1994 | Tomita et al. | 210/603 |
| 6,464,875 B1 * | 10/2002 | Woodruff | 210/603 |
| 6,663,777 B2 * | 12/2003 | Schimel | 210/603 |
| 6,706,185 B2 * | 3/2004 | Goel et al. | 210/605 |
| 6,776,816 B1 * | 8/2004 | Ringelberg et al. | 71/6 |
| 7,264,715 B2 * | 9/2007 | Hagino et al. | 210/198.1 |
| 2001/0045390 A1 | 11/2001 | Kim et al. | |
| 2003/0172697 A1 | 9/2003 | Sower | |
| 2003/0217968 A1 * | 11/2003 | Goel et al. | 210/605 |
| 2006/0124541 A1 * | 6/2006 | Logan et al. | 210/605 |
| 2007/0000836 A1 | 1/2007 | Elefritz | |
| 2007/0209998 A1 | 9/2007 | Abu-Orf | |

FOREIGN PATENT DOCUMENTS

| | | |
|---|---|---|
| JP | 9-262599 A * | 10/1997 |
| JP | 2003-334584 A * | 11/2003 |
| JP | 2005-161158 A * | 6/2005 |

OTHER PUBLICATIONS

International Search Report for Int'l Appl. No. PCT/US09/00689; Int'l Searching Authority; Mar. 23, 2009; 13 pages.

* cited by examiner

*Primary Examiner*—Fred Prince
(74) *Attorney, Agent, or Firm*—Ater Wynne LLP

(57) ABSTRACT

A method of treating a mixture of microorganisms containing phosphorus and magnesium, by first inducing the mixture microorganisms to release phosphorus and magnesium which is then tapped off as the mixture is thickened, to produce phosphorus and magnesium-rich liquid and phosphorus and magnesium-reduced treated mixture. This treated mixture is placed in an anaerobic digester where ammonia is formed but combines very little with phosphorus or magnesium as these elements have been greatly reduced in concentration. Next the high-ammonia mixture is dewatered, to produce an ammonia-rich liquid, which is combined with the phosphorus and magnesium-rich liquid. In one preferred embodiment a useable struvite product is harvested from this combination. Additionally, the production of nuisance struvite in the anaerobic digester is greatly reduced, in comparison with prior art waste treatment methods.

11 Claims, 3 Drawing Sheets

WASTE ACTIVATED SLUDGE STRIPPING TO REMOVE INTERNAL PHOSPHORUS

BACKGROUND

As part of secondary sewage treatment, primary treated sewage is treated with air or pure oxygen. In what is termed the "activated sludge" process, microorganisms utilize the oxygen to metabolize the incoming waste sewage, forming a mixture of microorganisms and sewage known as "mixed liquor." This mixture is moved to settling tanks for concentration, thereby forming concentrated activated sludge. A majority of this sludge is returned to the activated sludge process tankage. A separate portion of this sludge, termed "waste activated sludge" (WAS), is removed from the activated sludge process and sent to a sludge handling system for further treatment and disposal. In a stable system, the daily WAS is equal to the daily conversion of sewage into microorganisms so no net increase in mixed liquor bio-mass occurs.

Referring to FIG. 1, in one typical scheme 10, the WAS is sent to a centrifuge (or other thickening apparatus) 14 for thickening, the liquids are tapped off and returned to the wastewater plant for treatment, whereas the resultant thickened sludge is sent to an anaerobic digester 16 with other sludges, where it remains for 15 days or more before being sent to a second centrifuge (or other dewatering apparatus) 18 for dewatering. Unfortunately, struvite tends to form in digester 16, and other equipment downstream because of the ammonia, magnesium and phosphorus that are present can precipitate as struvite. This struvite is impractical to harvest and also has the deleterious effect of being deposited on surfaces in the reactor 16 and plugging pipes and equipment leading from the reactor.

A further centrifuge (or other dewatering apparatus) 18 produces further dewatered sludge 20, which is either beneficially reused or disposed of, and liquids 22, which are rich in ammonia and phosphorus. It has been learned that prilled struvite can be harvested from liquids 22, by a struvite reactor 24. This prilled struvite is a marketable product that can be used as a timed release fertilizer, thereby defraying some of the costs of sewage treatment. Unfortunately, the struvite harvest requires the addition of magnesium into the process, which forms a large part of the costs of the process and reduces the profitability.

SUMMARY

The present invention may take the form of a method of treating a first mixture of waste solids and microorganisms containing phosphorus and magnesium, by first inducing the mixture microorganisms to release phosphorus and magnesium which is then tapped off as the mixture is thickened, to produce phosphorus and magnesium-rich liquid and phosphorus and magnesium-reduced treated mixture. This treated mixture is placed in an anaerobic digester where ammonia is formed but combines very little with phosphorus or magnesium as these elements have been greatly reduced in concentration. Next the high-ammonia mixture is dewatered, to produce an ammonia-rich liquid, which is combined with the phosphorus and magnesium-rich liquid. In one preferred embodiment a useable struvite product is harvested from this combination. Additionally, the production of nuisance struvite in the anaerobic digester is greatly reduced, in comparison with prior art waste treatment methods.

One method of practicing the present invention is shown in FIG. 2 below and described in the accompanying text, which should help to clarify the invention.

DETAILED DESCRIPTION OF THE PREFERRED EMBODIMENTS

Figure 1:
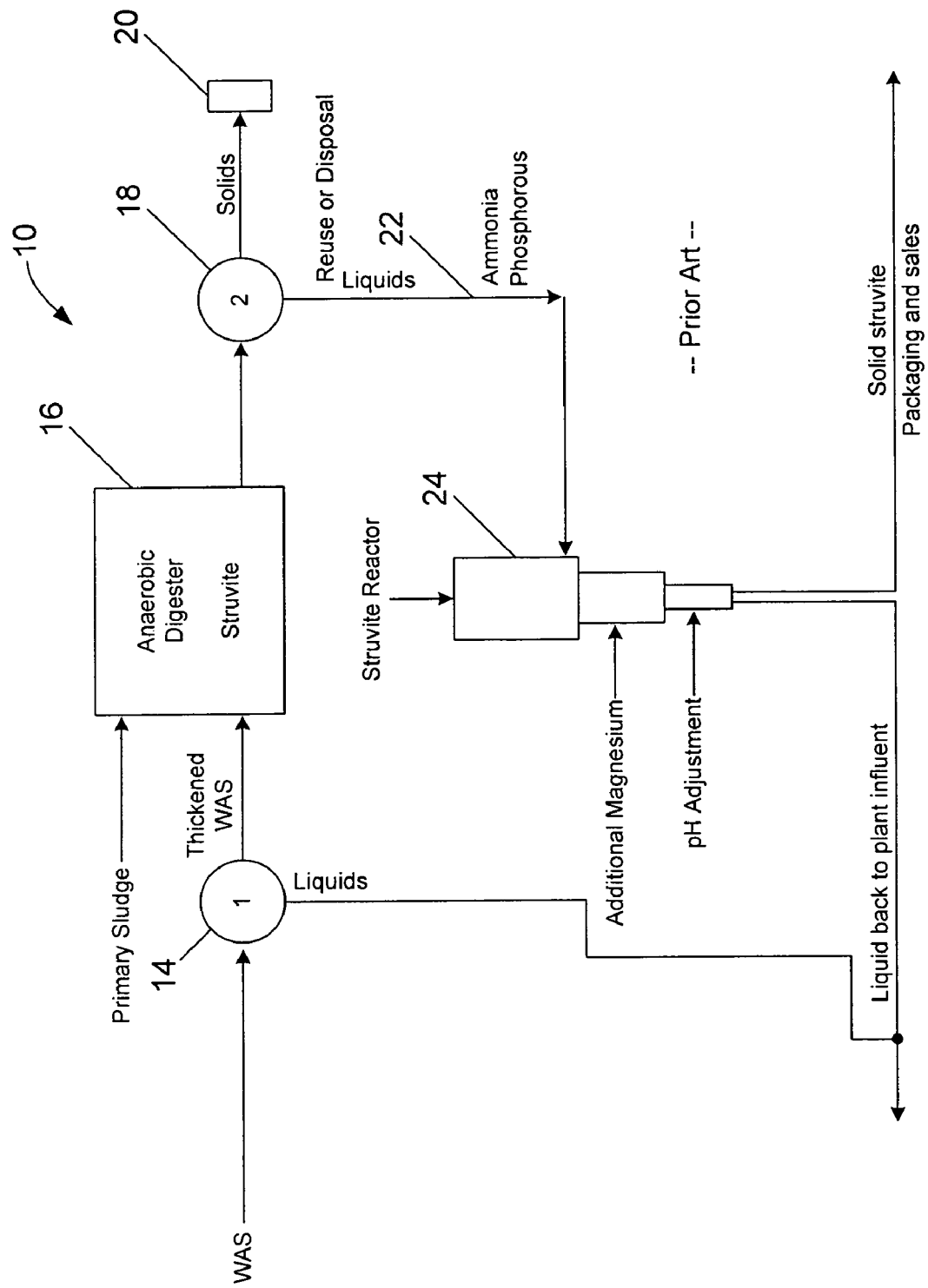
FIG. 1 is a block diagram of a prior art waste treatment system.
Figure 2:
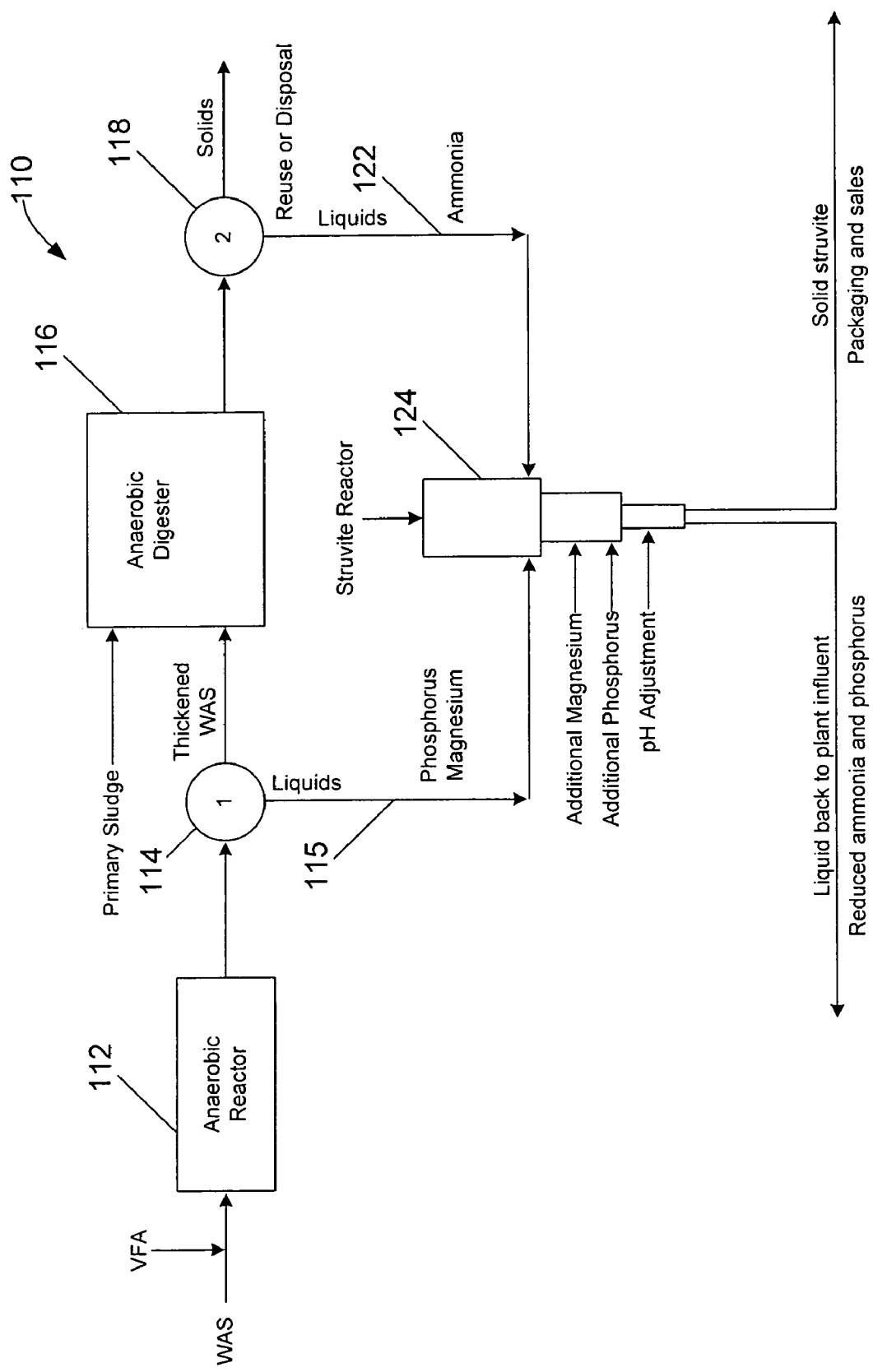
FIG. 2 is a block diagram of a waste treatment system according to the present invention.

Referring to FIG. 2, in a preferred embodiment of a waste activated sludge (WAS) treatment method 110, phosphorus and magnesium are released by microorganism action in an anaerobic reactor 112, where the WAS is held, for a minimum time of 0.5 hours. One method for effecting this release is by adding readily biodegradable carbon compounds (RBCs), such as volatile fatty acids (VFAs) to the sludge in the anaerobic reactor, with 5 to 8 grams of VFA added per gram of planned phosphorous release. In another technique, the activated sludge is held for 36 to 96 hours, without the addition of VFAs, for endogenous respiration and fermentation to release phosphorus and magnesium.

The resultant WAS is sent to a thickening device 114, such as a centrifuge, thickening belt or rotating screens and the resultant liquids 115, having enhanced phosphorus and magnesium levels, are sent to a struvite reactor 124, which will be discussed further below. There is only very minimal struvite production in the liquids 115, because they have a very low ammonia level. VFAs or other forms of RBCs can be generated by fermentation as in the UFAT process disclosed in U.S. Pat. No. 6,387,264. Other methods of obtaining VFAs, include various fermentation methods, harvesting from various waste products and purchase as industrial chemicals, such as acetic acid.

The thickened WAS with reduced phosphorus and magnesium levels is sent to an anaerobic digester 116 with other sludges and is typically held there for a minimum of 15 days, where it further treated by anaerobic bacteria which generate high concentrations of ammonia. The production of struvite in digester 116, is however, greatly reduced in comparison with the amount of struvite produced in digester 16 of the prior art system (which could be identical to digester 116) because of the reduction in phosphorus and magnesium in the thickened WAS, both of which are necessary for the formation of struvite. This reduction in struvite formation greatly reduces the formation of struvite deposits in the digester and pipes and equipment downstream from anaerobic digester 116.

The treated sludge from digester 116 is dewatered 118, by use of a centrifuge, dewatering belt, screen, plate and frame presses, etc. with the resultant dewatered solids being beneficially reused or disposed. The ammonia-rich liquids 122, which are less able to make struvite in the associated pipes and equipment because of the reduced phosphorus and magnesium, are sent to struvite reactor 124, where the abundant ammonia combines with the phosphorus and magnesium of the liquids 115 to form struvite.

Figure 3:
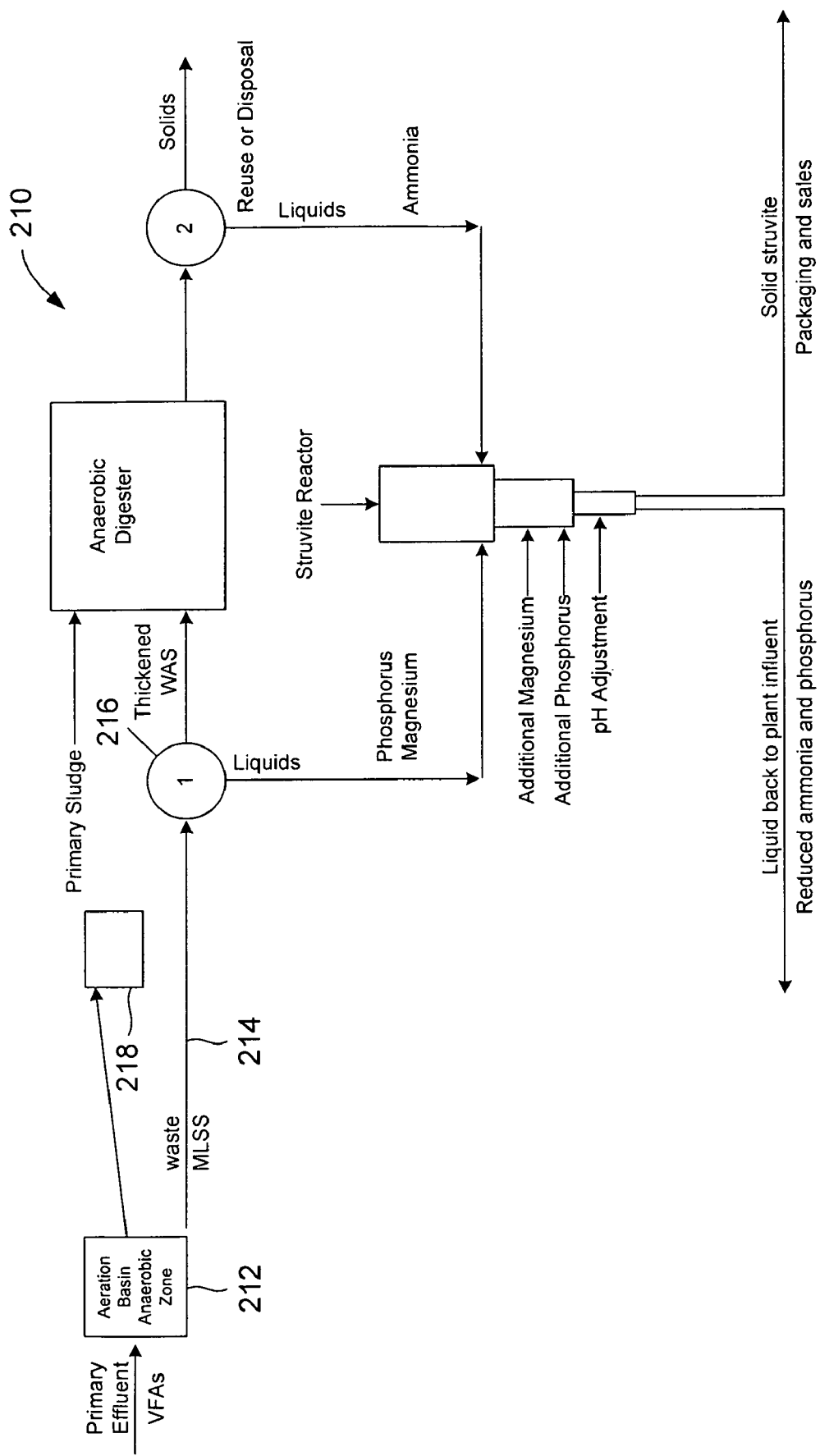
FIG. 3 is a block diagram of an alternative embodiment of a waste treatment system according to the present invention.

Referring to FIG. 3, in a second preferred embodiment, input to the system 210 is in the form of mixed liquor suspended solids (MLSS) 214 taken from the anaerobic zone 212 of the aeration basin, in an enhanced biologic phosphorous removal (EPBR) system. A remainder of the MLSS progresses to a further portion of the aeration basin 218. RBCs are added to the added to the MLSS in a standard EPBR system, thereby causing phosphorus to be released from the microorganisms. Other than this difference the processing is largely the same, although some variation is necessary to accommodate the larger flow 214 into the thickener 216, as MLSS is typically three times as dilute as WAS. To handle the dilute flow, thickener 216 utilizes gravity thickening that is optionally followed by a belt or centrifuge. The anaerobic reactor 112 and supplemental addition of RBCs, shown in FIG. 2, can be eliminated.

For either embodiment, the struvite reactor can take any form that permits the combination of the phosphorus and magnesium with the ammonium, to form struvite, including a simple settling tank, where spontaneously precipitated struvite would form and settle for reuse as a raw material, fertilizer or as a waste product. In one preferred embodiment prilled struvite is formed by a method disclosed in International Publication Number WO 2005/077834 A1.

In a first preferred variant of either the MLSS or the WAS embodiment no magnesium is added, with the magnesium present in liquids 115 being adequate to form more struvite than could be produced in prior art methods that require the addition of magnesium. In a second preferred variant, magnesium is added, thereby causing the system to produce additional struvite and a waste stream with less phosphorus and ammonia to be recycled back to the wastewater plant for re-treatment. In addition, phosphorus can be added to increase struvite production and reduce the amount of ammonia sent back for re-treatment.

The above description is intended to provide an example of one method that falls within the scope of the invention. Skilled persons will recognize that other methods will also fall within the scope of the invention.

The invention claimed is:

1. A waste treatment process, comprising:
   (a) producing a first mixture of solids, microorganisms and liquid from waste water, and wherein said microorganisms contain phosphorus and magnesium;
   (b) removing phosphorus and magnesium from said microorganisms and permitting said phosphorus and magnesium to dissolve in said liquid, to produce a treated mixture that includes dissolved magnesium and phosphorus;
   (c) thickening said treated mixture to produce a phosphorus and magnesium-rich liquid that is separated from the remaining phosphorus and magnesium-reduced mixture;
   (d) further anaerobic treating said phosphorus and magnesium-reduced mixture, thereby creating an ammonia-rich, phosphorus and magnesium-reduced mixture;
   (e) dewatering said ammonia-rich mixture to produce ammonia-rich liquid; and
   (f) mixing said ammonia-rich liquid with said phosphorus and magnesium-rich liquid, to produce struvite.

2. The process of claim 1, wherein step (b) is performed by holding said treated mixture in an anaerobic reactor and adding readily biodegradable carbon compounds to said activated sludge.

3. The process of claim 2, wherein said readily biodegradable carbon compounds include volatile fatty acids.

4. The process of claim 2, wherein said readily biodegradable carbon compounds include compounds that are converted into volatile fatty acids by said microorganisms.

5. The process of claim 1, wherein said first mixture is waste activated sludge.

6. The process of claim 1, wherein said first mixture is mixed liquor suspended solids.

7. The process of claim 1, wherein step (b) is performed by passing said first mixture through an anaerobic zone, wherein volatile fatty acids are present which cause phosphorous and magnesium to be expelled from the microorganisms.

8. The process of claim 1, wherein step (b) is performed by retaining said first mixture in an anaerobic reactor for more than 36 hours.

9. The process of claim 1, wherein said step of mixing said magnesium and phosphorus-rich liquid with said ammonia-rich liquid is performed in a struvite reactor and wherein magnesium is added to said struvite reactor or any input thereto, to increase production of struvite.

10. The process of claim 1, wherein said ammonia-rich liquid is mixed with said phosphorus and magnesium-rich liquid in a manner that produces a usable struvite product.

11. The process of claim 1, wherein said phosphorus and magnesium reduced mixture produced in step (c) is in the form of a sludge, and step (d) is performed with said sludge mixed with at least one other sludge from said waste treatment process.

* * * * *